United States Patent [19]
Pugh et al.

[11] Patent Number: 5,740,899
[45] Date of Patent: Apr. 21, 1998

[54] POSITIVE SPACING CONVEYOR APPARATUS

[76] Inventors: Roger Dale Pugh, 4831 Antler Dr., Greenwood, Ark. 72936; Herman H. Tolbert, Rte. 1, Box 26, Bokoshe, Okla. 74830

[21] Appl. No.: 571,626

[22] Filed: Dec. 11, 1995

Related U.S. Application Data

[63] Continuation-in-part of Ser. No. 371,875, Jan. 12, 1995, Pat. No. 5,474,493.

[51] Int. Cl.⁶ .................................................. B65G 47/24
[52] U.S. Cl. ...................... 198/392; 198/443; 198/461.3
[58] Field of Search ................................. 198/392, 443, 198/461.2, 461.3, 495, 803.14

[56] References Cited

U.S. PATENT DOCUMENTS

| | | | |
|---|---|---|---|
| 2,454,285 | 11/1948 | Krueger | 198/461.2 |
| 2,941,651 | 6/1960 | Hutter . | |
| 3,049,215 | 8/1962 | Hutter . | |
| 3,054,497 | 9/1962 | Davis et al. . | |
| 3,224,554 | 12/1965 | Moulder et al. . | |
| 3,471,000 | 10/1969 | Bodolay . | |
| 3,561,041 | 2/1971 | Szymanski . | |
| 3,717,236 | 2/1973 | New | 198/461.2 |
| 3,815,782 | 6/1974 | Miller | 198/392 X |
| 4,094,412 | 6/1978 | Hoppmann et al. | 198/392 X |
| 4,171,045 | 10/1979 | Lapeyre | 198/803.14 X |
| 4,279,336 | 7/1981 | Henderson . | |
| 4,369,875 | 1/1983 | Schmitz | 198/461.2 X |
| 4,401,203 | 8/1983 | McDonald et al. | 198/392 |
| 4,526,269 | 7/1985 | Henderson . | |
| 4,578,001 | 3/1986 | Ochs et al. . | |
| 4,610,345 | 9/1986 | Spreen et al. . | |
| 4,705,156 | 11/1987 | Boling . | |
| 4,771,877 | 9/1988 | Langen | 198/461.3 |
| 4,830,172 | 5/1989 | Hilton et al. | 198/443 X |
| 4,934,510 | 6/1990 | Lutgendorf | 198/461.3 |
| 4,938,082 | 7/1990 | Buckley et al. | 198/392 X |
| 4,962,842 | 10/1990 | Limoni | 198/443 |
| 5,044,487 | 9/1991 | Spatafora . | |
| 5,355,992 | 10/1994 | Baig et al. | 198/495 |
| 5,372,236 | 12/1994 | Layer . | |
| 5,474,493 | 12/1995 | Tolbert | 198/392 X |

FOREIGN PATENT DOCUMENTS

| | | | |
|---|---|---|---|
| 2385623 | 12/1978 | France | 198/803.16 |

*Primary Examiner*—D. Glenn Dayoan
*Attorney, Agent, or Firm*—Joseph F. DePumpo

[57] ABSTRACT

An apparatus for placing randomly received items, such as poultry carcasses, in a single file and for placing adjacent single filed items in a substantially equidistant spaced relationship 10 includes a rotatable cone 12 having an outer periphery 14, a conveyor belt 28 disposed about the outer periphery 14 of the rotatable cone 12, a guide wall 64 for effecting disposal of the items in a single file on the conveyor belt, a speedup conveyor section 160 for receiving and accelerating the single filed items, and an inclined conveyor section 162 having a plurality of substantially equidistantly spaced carriers 220 for receiving the items from the speedup conveyor section 160 and placing adjacently received items in a substantially equidistantly spaced relationship to each other.

38 Claims, 9 Drawing Sheets

POSITIVE SPACING CONVEYOR APPARATUS

CROSS REFERENCE TO RELATED APPLICATION

This application is a continuation in part of application Ser. No. 08/371,875, filed Jan. 12, 1995, now U.S. Pat. No. 5,474,493.

FIELD OF THE INVENTION

This invention relates generally to poultry processing equipment, and in particular to an apparatus for placing poultry carcasses that are deposited in bulk into a single file and for placing adjacent single filed items in a substantially equidistant spaced relationship to each other.

BACKGROUND OF THE INVENTION

Various systems for sorting chicken carcasses by weight are employed in poultry processing facilities. Traditionally, conveyor lines commonly referred to in the industry as "shackle lines" have been used for that purpose. Those systems require that each chicken carcass be hung by its legs from a "shackle" and transported on the conveyor line to a downstream weighing station where it is weighed and then transported further to a release station where the chicken is automatically released from the shackle into a container of chickens that are of like weight range. Since each chicken must be manually placed on the shackle line, utilization of that system is a very labor intensive and tedious process.

To partially overcome the problems associated with the shackle line systems, weighing systems in which a conveyor belt carries the chickens to a weighing station disposed along the conveyor belt path are commonly utilized. These systems typically employ a plurality of arms or "flappers" that are positioned downstream of the weighing station to deflect each individual carcass to an area or a container designated for chickens having a like weight range.

Utilization of the latter system requires that each carcass enter the weighing station in a single file. Heretofore, the chicken carcasses have been manually placed on the conveyor belt in a single file upstream of the weighing station. Thus, the tedious manual labor associated with preparing the carcasses to be weighed and sorted by weight has not been eliminated by these systems.

In addition to placing the carcasses in a single file, it is also desirable to provide for adjacent carcasses to be spaced equidistantly with respect to each other. Such spacing enables each carcass to enter the weighing station at the precise moment with respect to the previous carcass, thus insuring maximum productivity.

DESCRIPTION OF THE PRIOR ART

Machines are known for placing a bulk of uniformly sized and relatively hard articles, such as rocks, pills, bottle caps, nuts and various types of fruits into a single file.

For example, one prior art single filing device includes a rotating bowl having an interior conical surface, and a stationary ramp having tongue members which fit into groove members disposed in the outer periphery of the conical surface. The articles are fed in bulk onto the conical surface where they gravitate to the outer periphery and then slide up the ramp in a single file to an outer rim of the bowl.

In another approach, the articles to be placed in a single file are deposited in bulk onto the center of a rotating horizontal table having a plurality of radial pockets at the top periphery of the table. The radial pockets are opened and closed by triangular gates at their entry ends which open and shut as the table rotates so that only one object at a time is permitted into each receiving pocket.

These and other prior art apparatus are entirely unsatisfactory for placing items such as poultry and similar carcasses into a single file. This is because the carcasses tend to be relatively soft and sticky and as such tend to adhere to each other and resist sliding. Moreover, due to their asymmetrical shape, they do not roll easily, and if caused to roll, their shape combined with their springy texture creates a tendency for them to move erratically and bounce making them difficult to control.

Accordingly, there is a need for a new and improved apparatus for placing items such as poultry and similar animal carcasses into a single file so that they may be conveniently received at a downstream station for further processing.

SUMMARY OF THE INVENTION

The present invention provides a unique apparatus for placing randomly deposited items, such as poultry carcasses in a single file and, preferably, includes apparatus for positively spacing the items equidistant from each other. In accordance with one important aspect of the invention, the apparatus includes a rotatable member, preferably cone shaped, having an outer periphery, a conveyor belt disposed about the outer periphery of the rotatable member, and a guide wall for guiding items in a single file on the conveyor.

In accordance with another aspect of the invention, the apparatus is characterized by a conveyor belt including an entry section, a progressively elevating section, a removal section and a return section. The entry section is disposed adjacent the outer periphery of the rotatable cone member so that items deposited in bulk onto the conical surface of the rotatable cone member gravitate to the entry section of the conveyor belt and are ushered through the progressively elevating section to the removal section of the conveyor belt.

In accordance with another aspect of the invention, the guide wall extends gradually across the removal section of the conveyor belt so that the effective width of the removal section progressively decreases to a discharge portion that is disposed a predetermined distance from the inner edge of the conveyor belt. Accordingly, if two or more items traveling on the conveyor belt, in the removal section, are in a side-by-side orientation, only one item is permitted to pass by the discharge portion, with the remaining items falling back to the conical surface of the rotatable cone member so that items exiting the removal section are in a single file.

In accordance with another aspect of the invention, a wiper bar extends above and across the removal section of the conveyor belt for eliminating stacking of the items.

In accordance with yet another aspect of the invention, a guide rail having a curved end engages the items that are hanging partially over the inner edge of the conveyor belt in the removal section and causes them to move fully onto the conveyor belt.

In accordance with still another aspect of the invention, the return section of the conveyor belt includes a washing system for advantageously removing material from the surface of the belt.

In accordance with yet another aspect of the invention, the apparatus may include a speedup conveyor for receiving the items from said removal section and accelerating the items

3 individually to an inclined conveyor having a plurality of carriers disposed thereon for placing adjacently received items in a substantially equidistant relationship to each other.

In accordance with still another aspect of the invention, the inclined conveyor may include an item waiting station comprising a stationary plate on which the items received from the speedup conveyor rest or slide until they are received by the carriers.

In accordance with another aspect of the invention, the apparatus may include a discharge conveyor section for receiving the items from the carriers and transporting them to a processing station.

In accordance with yet another aspect of the invention, the carriers each include a platform portion which rotates when it is adjacent the discharge conveyor section to effect a smooth transfer of the items from the platform to the discharge conveyor section.

One advantage of the present invention is that it provides a mechanically uncomplicated and relatively inexpensive device for placing items, particularly poultry and similar carcasses, that are deposited in bulk into a single file and for placing adjacent single filed items in a substantially equidistant relationship with respect to each other.

Another advantage of the present invention is that it is easy to keep clean and inexpensive to maintain.

Still another advantage of the present invention is that it provides a uniquely adjustable guide wall that extends across the conveyor belt to effect disposal of the items in a single file on the conveyor belt.

As will become more apparent hereinafter, the present invention provides a new and improved apparatus for placing randomly deposited items in a single file and for placing adjacent single filed items in a substantially equidistant relationship with respect to each other. The apparatus can be effectively utilized in many applications, and it achieves the foregoing advantages in a novel and unobvious manner.

BRIEF DESCRIPTION OF THE DRAWINGS

Referring now to the drawings in which like reference numerals and letters indicate corresponding elements throughout several views.

4

DETAILED DESCRIPTION OF THE PREFERRED EMBODIMENTS

In the description which follows, like parts are marked throughout the specification and drawings with the same reference numerals, respectively. The drawing figures are not necessarily drawn to scale and the proportions of certain parts have been exaggerated for purposes of clarity.

As shown in the exemplary drawings, one aspect of the present invention is embodied in a novel and unique apparatus for placing randomly deposited items such as dressed poultry in a single file so that they may be conveniently received at a downstream station for further processing such as inspection, weighing, sorting and the like.

Figure 1:
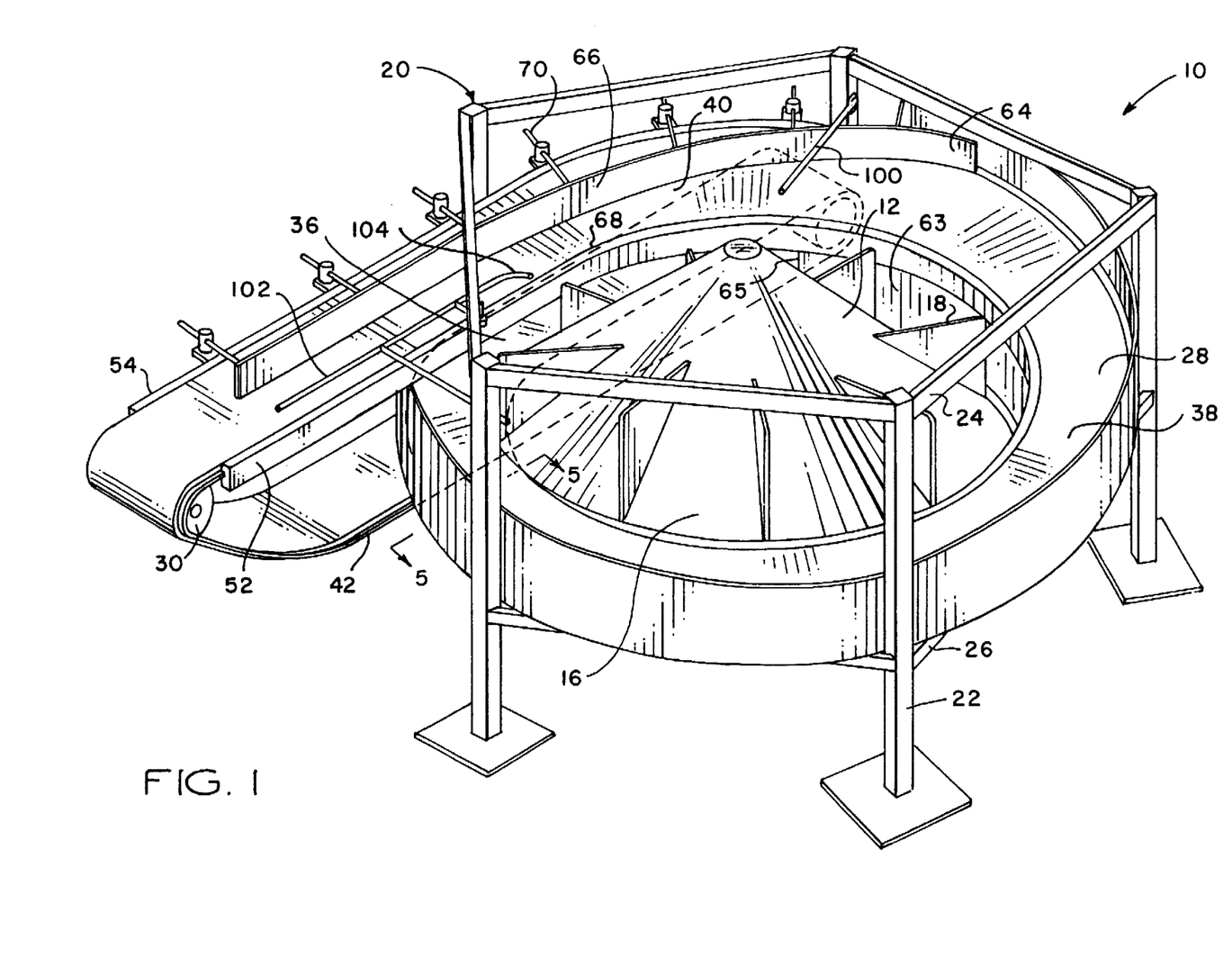
FIG. 1 is a general perspective view of the apparatus for placing randomly deposited items in a single file in accordance with the present invention.
Figure 3:
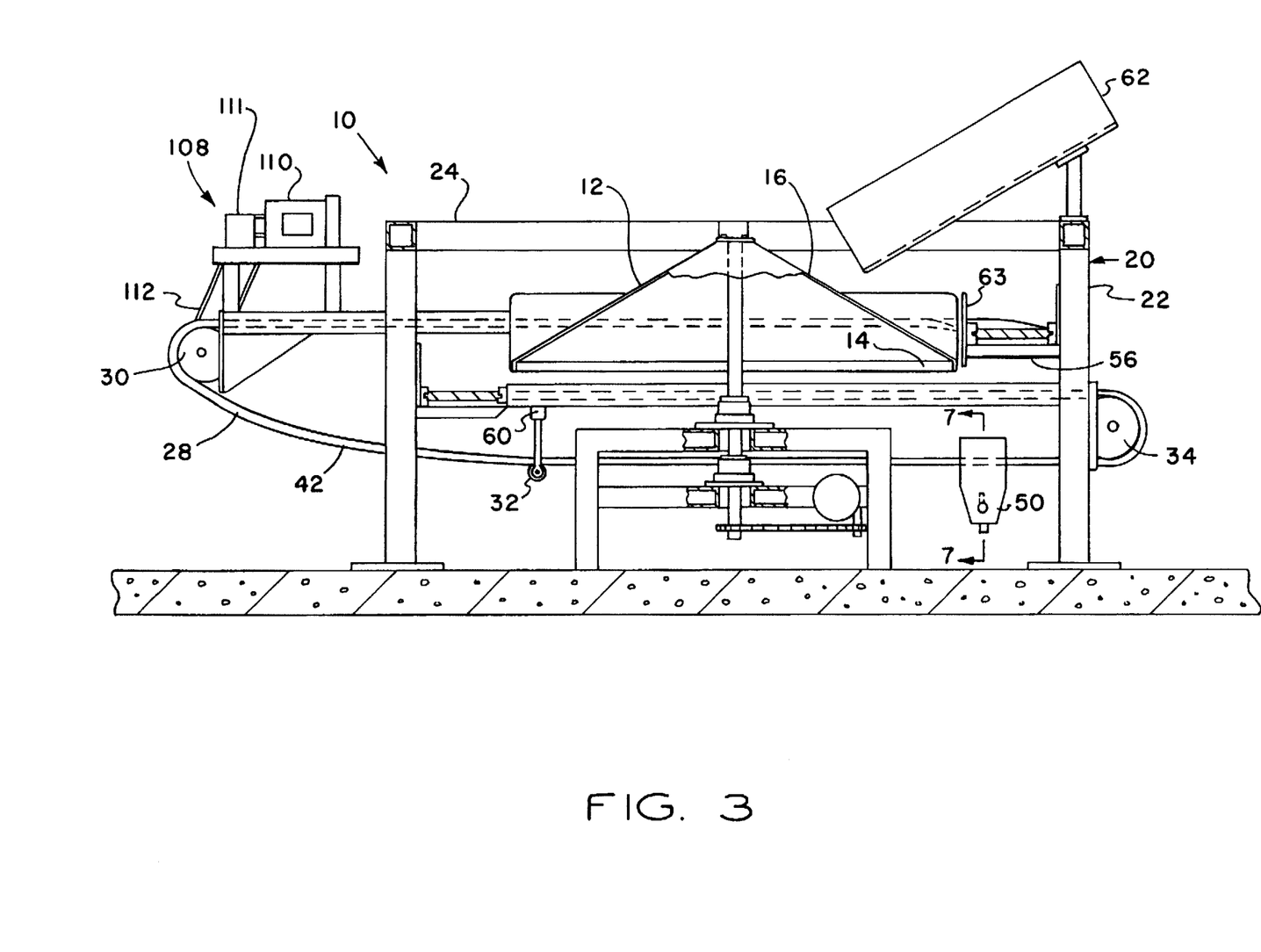
FIG. 3 is a section view taken generally along line 3—3 of FIG. 2.

Referring now to FIGS. 1 and 3, there is illustrated part of an apparatus for placing randomly deposited items in a single file and equidistantly spaced from each other, generally designated by the numeral 10, constructed in accordance with the principles of the present invention. The apparatus 10 includes a rotatable cone member 12 having an outer periphery 14 and a conical surface 16 with a plurality of spaced separator blades 18. The apparatus 10 includes a frame 20 comprising circumferentially spaced stanchions 22 interconnected by upper and lower lateral braces 24, 26 which is adapted to support an endless conveyor belt 28.

Figure 2:
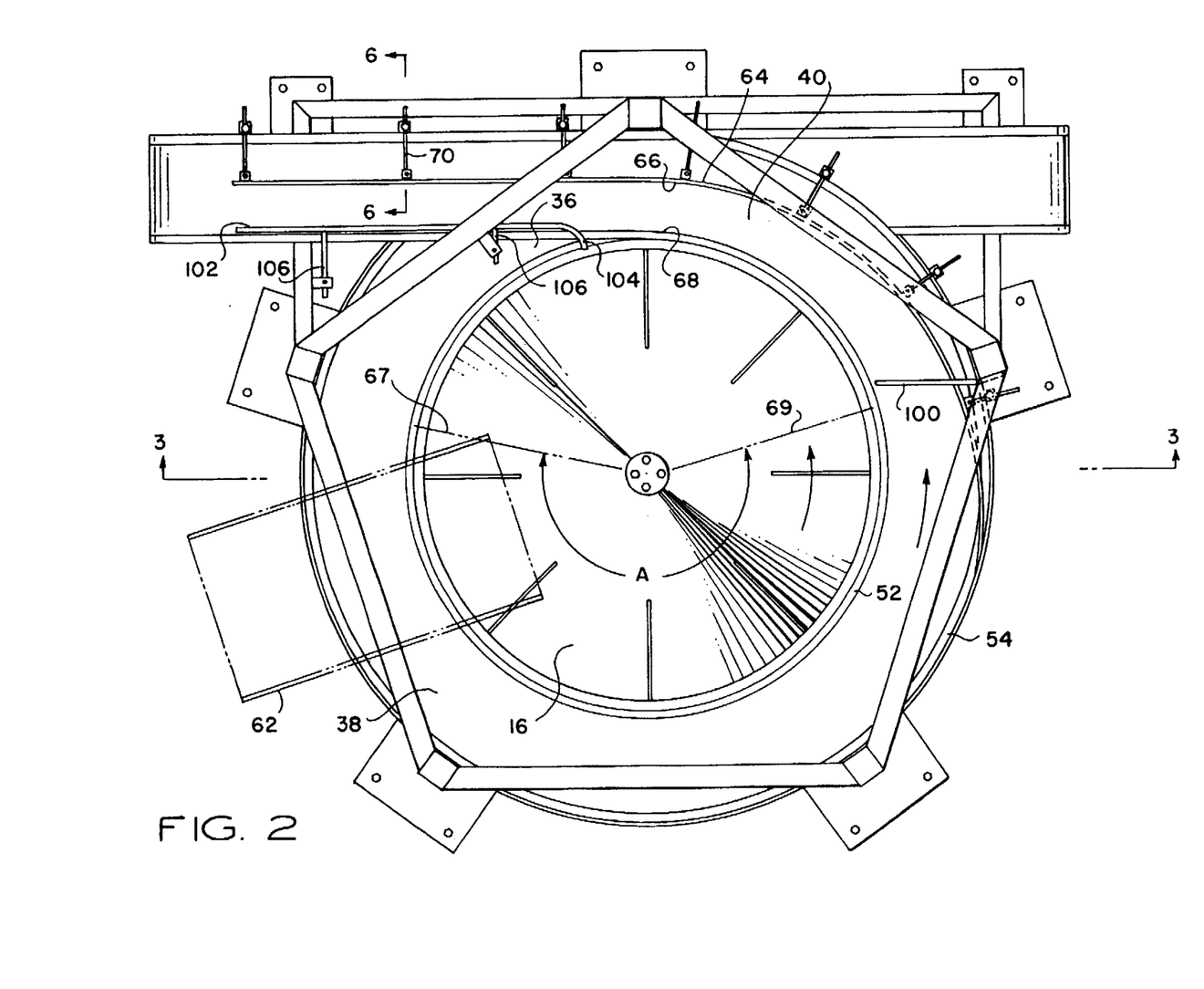
FIG. 2 is a top plan view of the apparatus shown in FIG. 1.

The conveyor belt 28 may be of the type manufactured by Intralox, Inc., New Orleans, La. as a series 2200, constructed of polypropylene for normal applications or polyethylene for applications involving elevated temperatures. The conveyor belt 28 is disposed about the outer periphery 14 of the rotatable cone member 12 and is trained about a drive roller 30, an idler roller 32 and a return roller 34. As shown in FIGS. 1 and 2, the conveyor belt 28 includes an entry section 36, a progressively elevating section 38, a removal section 40 and a return section 42, and its radially inner and outer edges 44, 46 each comprise an edge tab 48 (see FIG. 5). The return section 42 includes a washing system 50 which is shown generally in FIG. 3 for advantageously removing poultry detritus and other undesirable material from the conveyor belt 28.

Figure 5:
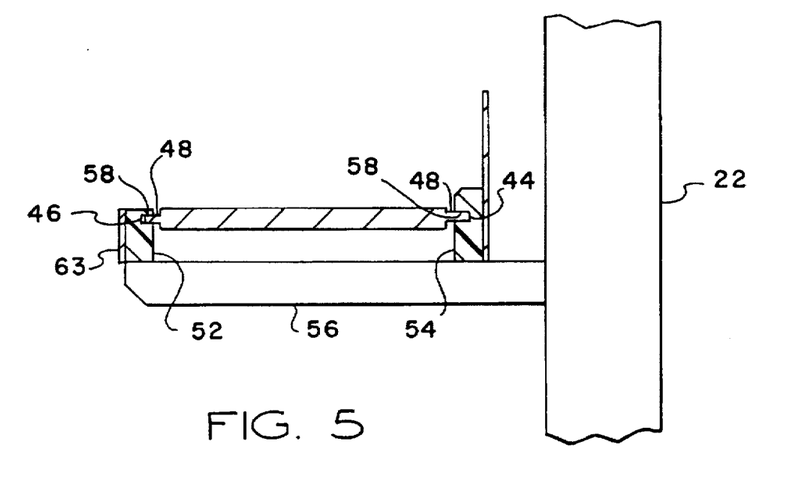
FIG. 5 is a section view of a portion of the conveyor belt support structure taken along line 5—5 of FIG. 1.

As best illustrated in FIGS. 1, 2 and 5, radially inner and outer guide members 52, 54 respectively, are disposed about the inner and outer edges 44, 46 of the conveyor belt for supporting and guiding the conveyor belt. As best illustrated in FIG. 5, the guide members 52, 54 are supported by the frame 20 through the provision of support bars 56 which extend laterally from each stanchion 22, respectively. In accordance with this arrangement, each guide member 52, 54 includes a slotted section 58 in which the edge tabs 48 of the conveyor belt 28 ride to guide the conveyor belt through the entry section 36, the progressively elevating section 38 and the removal section 40. Moreover, a plurality of support beams 60, only one of which is shown (see FIG. 3), are provided at various locations along the path of the conveyor belt between the inner and outer guide members 52, 54 to maintain the proper distance between the guide members 52, 54.

The items to be arranged in a single file are deposited through a loading chute 62, which is preferably oriented as shown in FIG. 2, but may alternatively be located as shown in FIG. 3, and onto the conical surface 16 of the rotatable cone 12 in a bulk fashion. The items then gravitate, slide or roll, down the conical surface 16 and onto the entry section 36 of the conveyor belt where they are ushered through the progressively elevating section 38 to the removal section 40 of the conveyor belt 28.

However, as shown in FIG. 1, a retaining wall 63 extends partially around the cone in a counterclockwise direction from the onset of the progressively elevating section 38 to a distal end 65 and increases in height in accordance with the ascent of the progressively elevating section 38 of the conveyor belt. The retaining wall 63 is suitably supported by inner guide member 52 as shown by way of example in FIGS. 3 and 5.

An adjustable guide wall 64 is disposed above and extends gradually across the removal section 40 of the conveyor belt 28 to a discharge portion 66 disposed a predetermined distance from the inner edge 68 of the conveyor belt 28 so that the effective width of the conveyor belt 28 at the discharge portion 66 is such that only a single item, such as a poultry carcass, is permitted to pass therethrough.

Accordingly, if two or more items are in a side-by-side orientation with respect to each other, only one item is permitted to pass through the discharge portion 66 of the guide wall 64, with the remaining items falling back to the conical surface 16 of the rotatable cone 12 where they once again gravitate to the entry section 36 of the conveyor belt 28 and are ushered through the progressively elevating section 38 to the removal section 40.

Figure 6:
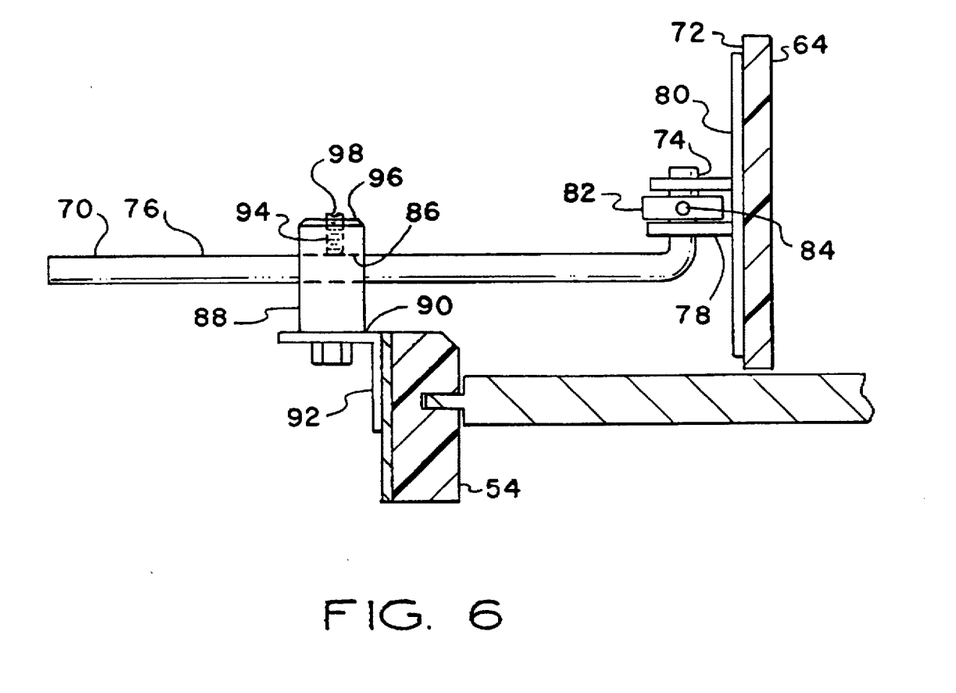
FIG. 6 is a section view of the adjustable guide wall taken along line 6—6 of FIG. 2.

As shown in FIG. 6, the location of the guide wall 64 with respect to the inner edge 68 of the conveyor belt 28 is adjustable by provision of plural, spaced apart rods 70 which engage and are removably secured to the back side 72 of the guide wall 64. Each rod has a distal end 74 extending normal to the main portion 76 of the rod 70 which extends through a clevis 78 on a guide wall support bracket 80 and is secured to the clevis 78 by a collar 82 having a retaining pin 84 extending therethrough. The main portion 76 of the rod extends through an aperture 86 in a support column 88 which is secured to the outer guide member 54 at one end 90 by an L-shaped bracket 92. The support column 88 includes a bore 94 at its opposite end 96 which is adapted to receive a set screw 98.

As best illustrated in FIG. 1, a wiper bar 100 is secured to one of the upright stanchions 22 and extends above and across the conveyor belt 28 to insure that items that are stacked or partially stacked upon other items are displaced back to the conveyor belt 28.

Referring to FIGS. 1 and 2, a guide rail 102 having a curved end 104 is secured to the frame 20 by support members 106. The curved end 104 engages the items that are disposed partially over the inner edge 68 of the conveyor belt 28 causing them to move fully onto the conveyor belt.

As best illustrated in FIG. 3, the belt conveyor system 108 comprises an electric motor 110, such as the type manufactured by U.S. Motors, Inc. as Model No. 8835. The electric motor 110, is connected to a gear box 111 having an output shaft mechanically connected to a drive sprocket (not shown), and an endless chain 112 is entrained about the drive sprocket and a driven sprocket (not shown). The driven sprocket is mechanically connected to the drive roller 30 which drivingly engages the conveyor belt 28.

Figure 4:
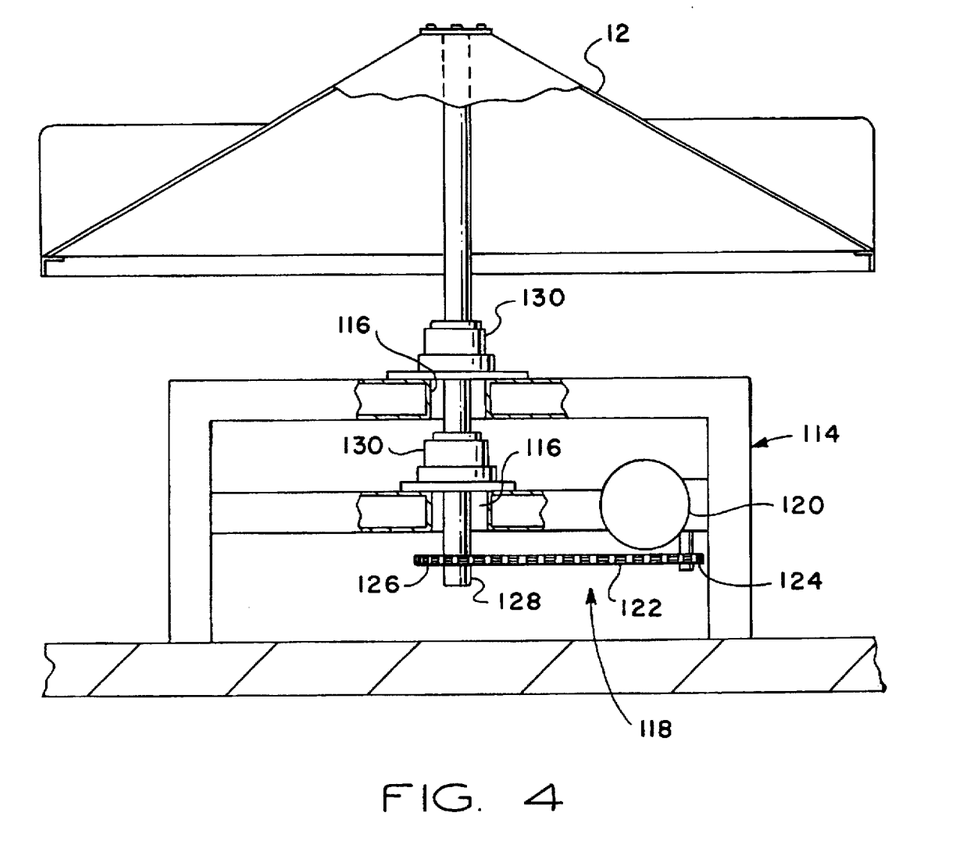
FIG. 4 is a detail section view of the rotatable cone member taken along the same line as FIG. 3 on a larger scale.

Referring now to FIG. 4, the rotatable cone 12 is supported by a base generally designated as 114 having apertures 116 extending therethrough. The drive system 118 for the rotatable cone 12 includes an electric motor 120 connected to a gearbox (not shown), an endless chain 122 entrained about a drive sprocket 124 and a driven sprocket 126 and a drive shaft 128 that extends through the apertures 116 and which is supported for rotation by bearings 130. As with the belt conveyor system 108, a suitable electric motor is the type manufactured by U.S. Motors, Inc. as Model No. 8835.

Figure 7:
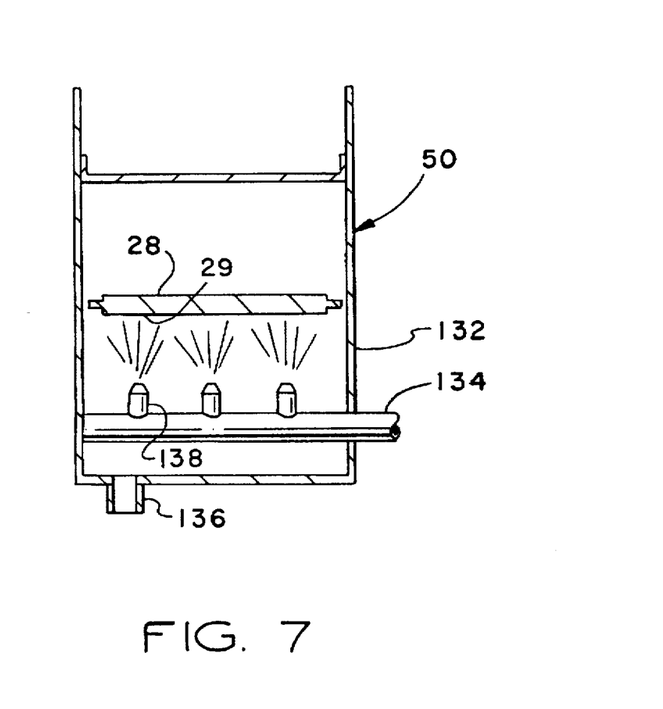
FIG. 7 is a section view depicting the belt washing system taken along line 7—7 of FIG. 1.

As illustrated in FIG. 7, the washing system 50 of the present invention includes a housing 132 having an inlet nozzle 134 that is connected to a water supply (not shown), and an outlet nozzle 136 that can be connected to a drain (not shown). The inlet nozzle 134 is in flow communication with a plurality of spray nozzles 138 that are oriented to direct pressurized water to the underside 29 of the belt 28.

The guide wall 64 and the guide members 52, 54 may be constructed of ultra-high molecular weight polymer, commonly known as UHMW, such as the type manufactured by PolyHi, a division of the Manasha Corporation, Ft. Wayne, Ind., as Tivar-100. Tivar-100 polymer material complies with the F.D.A. requirements for use in food contact applications and its surface characteristics allow items such as chicken carcasses to slide thereon. Those components or apparatus 10 not specifically mentioned may be made of conventional engineering materials normally used for similar processing apparatus.

The operation of the part of the apparatus 10 for placing items in a single file will now be described. Referring to FIGS. 1, 2 and 3, poultry items in substantial numbers are distributed through the loading chute 62 and onto the conical surface 16 of the rotatable cone 12. The rotatable cone 12 and the conveyor belt 28 rotate in the same direction as shown by the arrows in FIG. 2. The loading chute 62 is preferably oriented for depositing the poultry items onto the section of the conical surface 16 delineated by area A (see FIG. 2) so that the poultry items ride along the retaining wall 63 for a period of time after gravitating down the conical surface 16. This provides for a gradual migration of the poultry items onto the entry section 36 of the conveyor belt 28.

When the poultry items or carcasses clear the distal end 65 of the wall 63 they fall radially outward onto the entry section 36 of the conveyor belt 28. The conveyor belt 28 then carries the poultry items through the progressively elevating section 38 to the removal section 40 wherein any stacking is eliminated by the wiper bar 100 and where the guide wall gradually reduces the effective width of the removal section 40. At the discharge portion 60 of the guide wall 64, any poultry items that are not in a single file fall from the inner edge 68 of the conveyor belt 28 onto the rotatable cone 12 where they once again enter the conveyor belt at the entry section and are ushered through the progressively elevating section 38 to the removal section 40.

Figure 8:
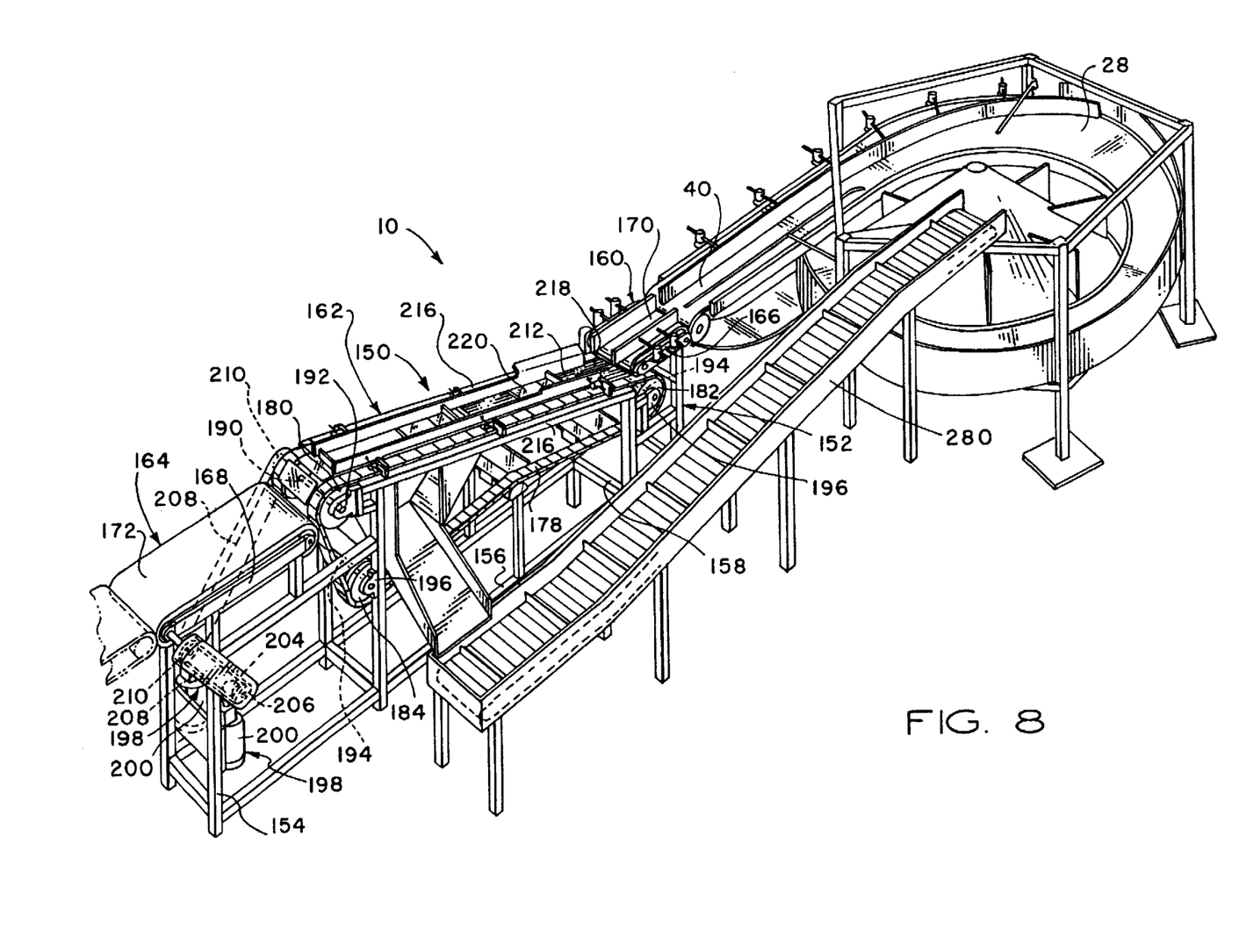
FIG. 8 is a general perspective view of the apparatus for placing items in a single file and for placing adjacent single filed items in a substantially equidistant relationship.
Figure 9:
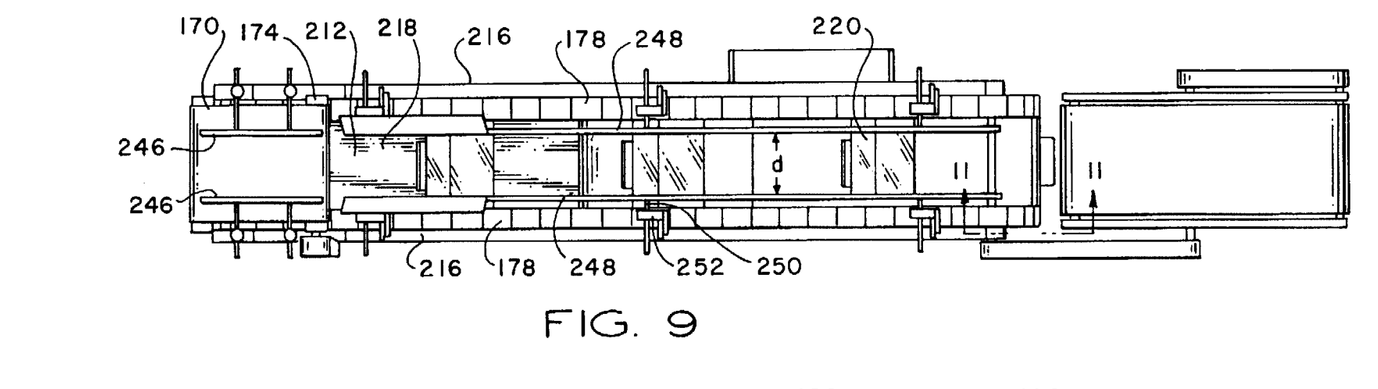
FIG. 9 is a top plan view of the positive spacing apparatus shown in FIG. 8.
Figure 10:
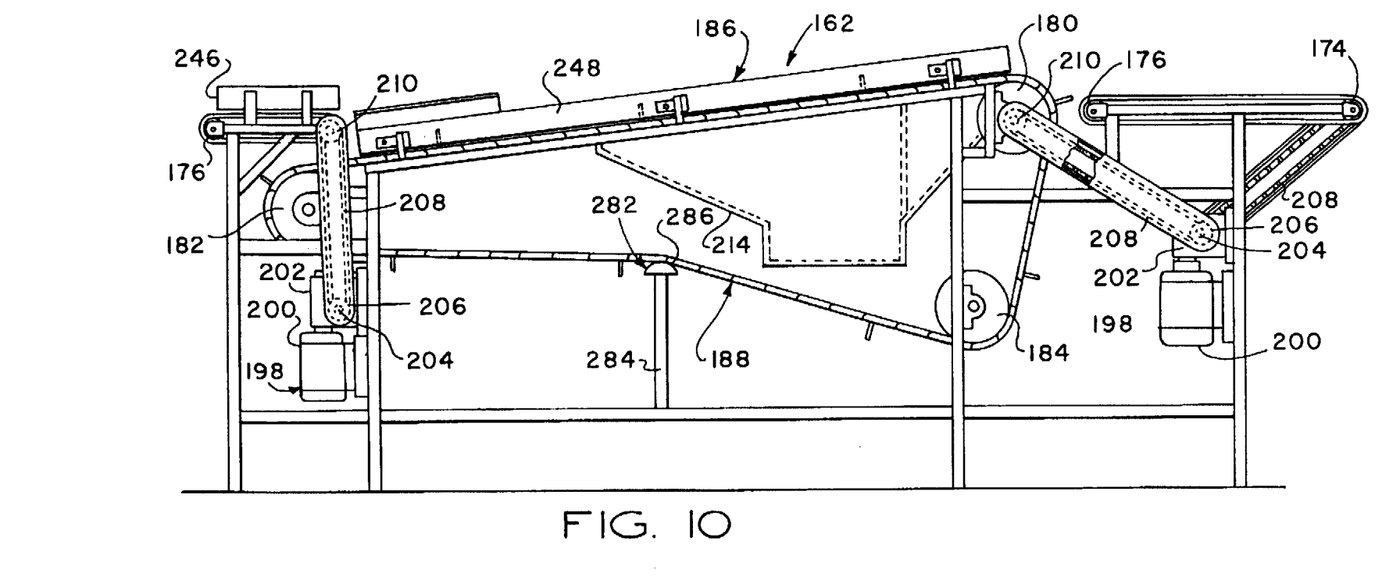
FIG. 10 is a side elevational view of the positive spacing apparatus shown in FIG. 8.

Referring now to FIGS. 8, 9 and 10, the apparatus 10 advantageously includes a positive spacing conveyor apparatus, generally designated by numeral 150 and which is installed between the removal section 40 of the conveyor belt 28 and a downstream processing station, such as a weighing station (not shown). The apparatus 150 includes a frame 152 comprising a plurality of upright stanchions 154 interconnected by longitudinal support members 156 and lateral support members 158 which define a speedup section 160, an inclined section 162 and a discharge section 164.

The speedup section 160 and the discharge section 164 are connected to the frame 152 by way of respective support arms 166, 168 and include respective conveyor belts 170 and 172 trained about driven wheels 174 and return wheels 176 (see FIG. 10). The speedup section and the discharge section conveyor belts 160, 164 may be of the type manufactured by Intralox, Inc., New Orleans, La. as a series 900.

The inclined section 162 includes a pair of laterally spaced conveyor belts 178, each of which is trained about a driven wheel 180, a return wheel 182 and an idler wheel 184 to define an inclined portion 186 and a return portion 188. The laterally spaced conveyor belts 178 may be of the type manufactured by Intralox, Inc., New Orleans, La. as an Intraflex 800 series. The driven wheels 180 are interconnected by an axle 190, the ends of which are rotatably connected to the frame 152 through bearing assemblies 192. In a similar manner, the return wheels 182 and the idler wheels 184 are interconnected by axles 194 which are rotatably connected to the frame 152 by bearing assemblies 196.

As best illustrated in FIG. 10, the inclined section 162 includes a tensioner 282 comprising a support 284 having a guide member 286 for supporting the return portion 188 of each conveyor belt 178.

Referring now to FIGS. 8, 9 and 10, the drive systems 198 for the speedup section 160, the inclined section 162 and the discharge section 164 each include an electric motor 200, such as the type manufactured by U.S. Motors, Inc. as Model No. 8835, which is mounted on an upright stanchion 154. Each motor drives a gearbox 202 having an output shaft 204 which is mechanically connected to a drive sprocket 206, and an endless chain 208 is entrained about each drive sprocket 206 and a driven sprocket 210.

Figure 12:
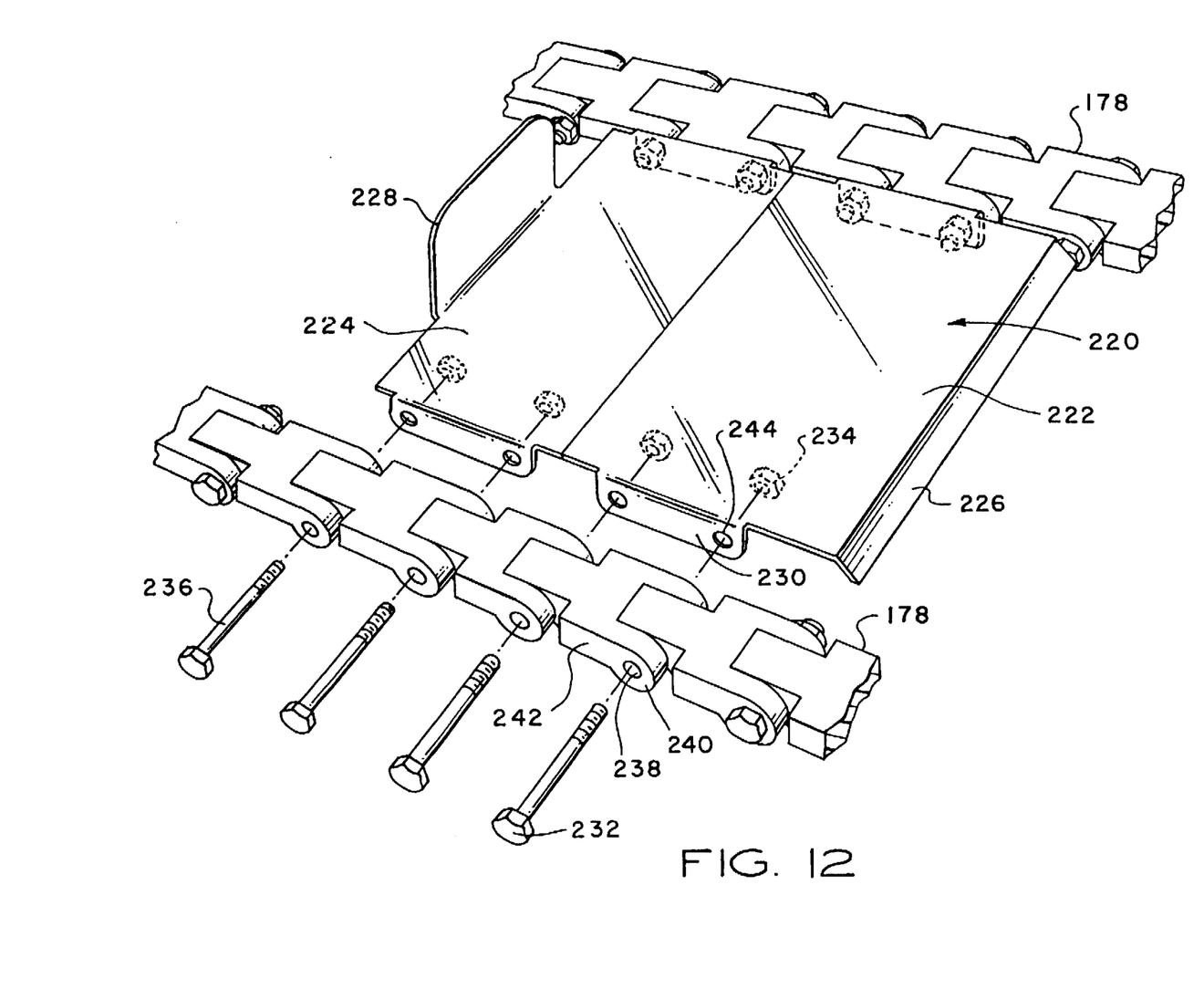
FIG. 12 is an exploded perspective view depicting a carrier and the manner in which the carrier is secured to an inclined section conveyor belt.

The incline section 162 includes a waiting station 212 and an exit chute 214, both of which are mounted between support members 216. The waiting station 212 comprises a stainless steel stationary support plate 218. A plurality of equidistantly spaced carriers 220 are disposed along the laterally spaced conveyor belts 178. In a preferred embodiment shown in FIG. 12, each carrier 220 comprises a platform 222 and an adjacent L-shaped member 224. The platform 222 has a leading edge 226 which extends downward, and the L-shaped member 224 has an upstanding member 228. The platform 222 and the L-shaped member 224 are connected to the laterally spaced conveyor belts 178 through provision of flanges 230 and fasteners 232. The fasteners 232 comprise a nut 234 and a threaded bolt 236 that extends through a bore 238 in the ends 240 of a link 242 in the respective laterally spaced conveyor belt 178 and through a hole 244 in the flange 230.

Figure 13:
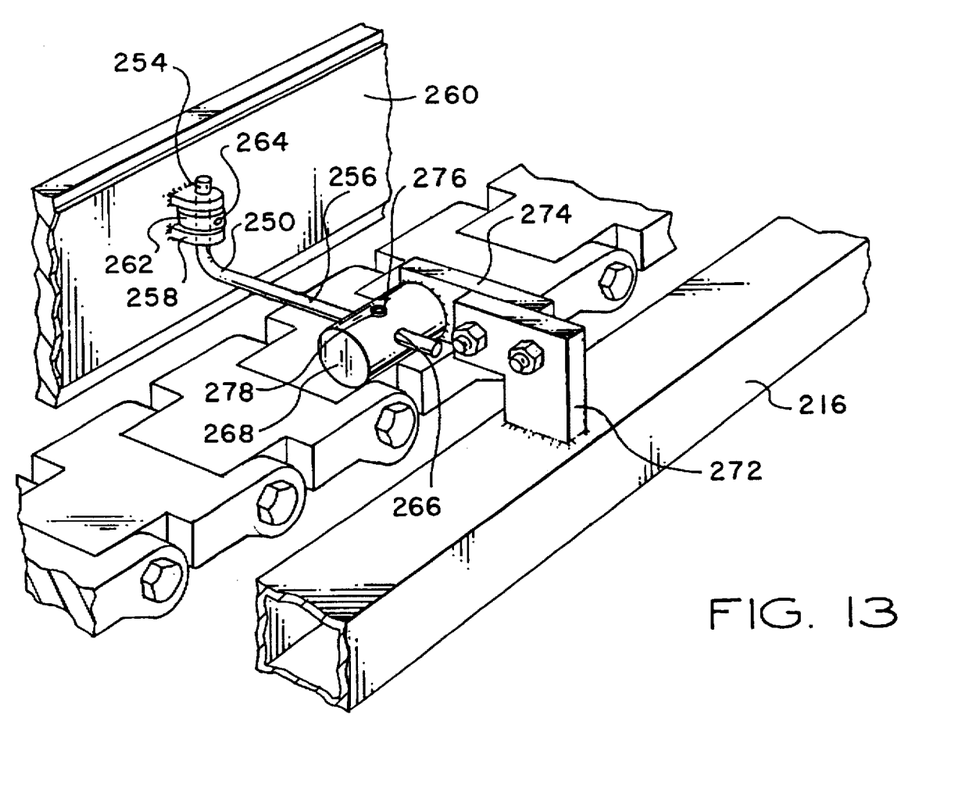
FIG. 13 is a perspective view of the adjustment mechanism for the adjustable guide walls in the inclined section.

Referring back to FIGS. 8, 9 and 10, a pair of parallel adjustable guide walls 246 may be disposed above the speedup conveyor belt 170 for guiding the items through the speedup section 160, and a second pair of parallel adjustable guide walls 248 are disposed above the laterally spaced conveyor belts 178 for guiding the poultry items through the inclined portion 186. The distance d between the guide walls in the inclined section 162 is adjustable by provision of plural spaced apart rods 250 and adjustment mechanisms 252. As best illustrated in FIG. 13, each rod 250 has a distal end 254 extending normal to the main portion 256 of the rod 250 which extends through a clevis 258 on a guide wall support bracket 260 and is secured to the clevis 258 by a collar 262 having a retaining pin 264 extending therethrough. The main portion 256 of the rod 250 extends through an aperture 266 in a support cylinder 268 which is secured to longitudinal support member 216 through L-shaped bracket 272 and support bar 274. The support cylinder 268 includes a bore 276 which is adapted to receive set screw 278.

As shown in FIG. 8, the positive spacing conveyor apparatus 150 is disposed so that the speedup section conveyor belt 170 is positioned immediately downstream of the removal section 40 of the conveyor belt 28. Alternatively, for certain applications it is desirable to use the positive spacing conveyor apparatus 150 as a stand-alone system as shown in FIGS. 2 and 3.

In operation, the speedup section conveyor belt 170 travels at a higher rate of speed than the conveyor belt 28. As such, when each poultry item contacts the speedup section conveyor belt 170, it accelerates away from the poultry item immediately behind it, increasing the space between the items. The speedup section conveyor belt 170 carries the poultry item to the waiting station 212 where it momentarily sits on the stainless steel support plate 218 until a carrier 220 sweeps up the poultry item and ushers it through the inclined portion 186. The poultry item is supported laterally by the guide walls 248 as it travels up the inclined section 162.

If the poultry item is not properly balanced on the carrier 220, or if more than one poultry item is disposed on a single carrier 220, the unbalanced or extra poultry item will fall out of the carrier 220 and into the exit chute 214 where it will be directed to a return conveyor 280 and back to the rotatable cone 12 as shown in FIG. 8, or alternatively, to the speedup section 160.

Figure 11:
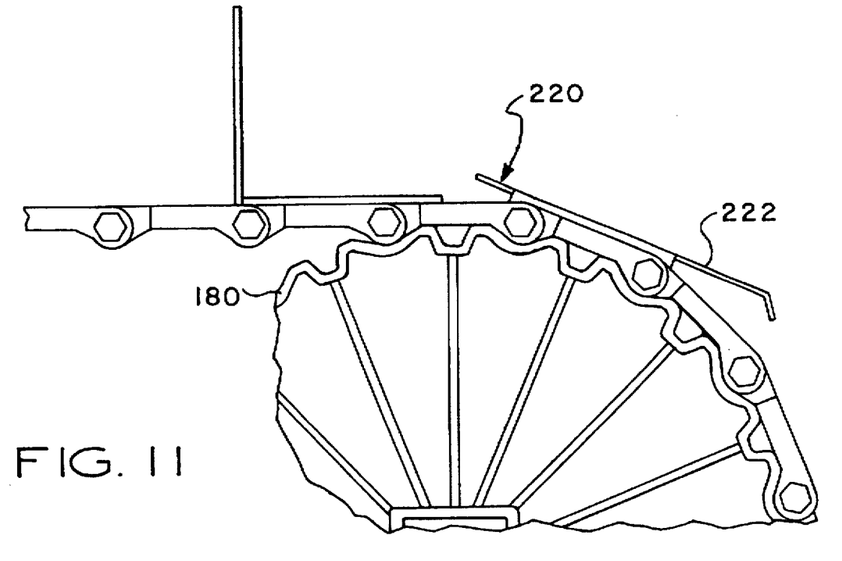
FIG. 11 is a partial section view taken along line 11—11 of FIG. 9.

As best illustrated in FIG. 11, when the carrier 220 reaches the driven wheel 180, the platform 222 begins to rotate as it begins its traversal around the driven wheel 180. Such rotation causes the poultry item to lean forward in the carrier so that it transfers smoothly onto the discharge section conveyor belt 172, thus reducing the tendency of the poultry items to bounce or roll off of the belt 172. The discharge conveyor belt 172 then transports the poultry item to a downstream station (not shown) for weighing and further processing.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention can be limited not by this detailed description, but rather by the claims appended hereto.

We claim:

1. An apparatus for placing items in a single file comprising:
   a rotatable member having an outer periphery;
   a conveyor having a removal section of a predetermined width and being disposed about the outer periphery of said rotatable member for receiving items from said rotatable member; and
   guide means extending gradually across the removal section to reduce the effective width of the removal section for guiding the items in a single file.

2. The apparatus of claim 1 wherein the rotatable member is substantially cone shaped.

3. The apparatus of claim 1 wherein the conveyor comprises an endless belt having an inner edge.

4. The apparatus of claim 3 wherein the guide means comprises a guide wall having a discharge portion disposed a predetermined distance from the inner edge of said endless belt.

5. The apparatus of claim 4 wherein the guide wall is supported by a plurality of spaced support members.

6. The apparatus of claim 1 wherein said conveyor includes a return section having means for washing said conveyor.

7. The apparatus of claim 1 including a wiper bar disposed above the conveyor for eliminating stacking of said items.

8. An apparatus for placing items in a single file comprising:

a rotatable member having an outer periphery;

a conveyor having a removal section and being disposed about the outer periphery of said rotatable member for receiving items from said rotatable member;

guide means disposed at the removal section for guiding said items into a single file along said conveyor;

a first conveyor section for receiving the items from said removal section and accelerating the items individually and a second conveyor section including an item waiting station and having a plurality of substantially equidistantly spaced carriers disposed thereon for receiving the items from said first conveyor section and placing adjacently received items in a substantially equidistant relationship to each other.

9. The apparatus of claim 8 wherein the item waiting station comprises a stationary support plate on which the items received from said first conveyor section rest or slide until they are received by the carriers.

10. The apparatus of claim 8 further comprising a third conveyor section for receiving the items from the carriers and transporting them to a processing station.

11. An apparatus for placing items in a single file comprising:

a rotatable member having an outer periphery;

a conveyor having a removal section and being disposed about the outer periphery of said rotatable member for receiving items from said rotatable member;

guide means disposed at the removal section for guiding said items into a single file along said conveyor;

a first conveyor section comprising endless belt means for receiving the items from said removal section and accelerating the items individually and a second conveyor section having a plurality of substantially equidistantly spaced carriers disposed thereon for receiving the items from said first conveyor section and placing adjacently received items in a substantially equidistant relationship to each other, the second conveyor section including an exit chute for receiving the items which are improperly situated on the carriers.

12. The apparatus of claim 11 further including a return conveyor for receiving the items from the exit chute and directing them to the rotatable member.

13. An apparatus for placing items in a single file comprising:

a rotatable member having an outer periphery;

a conveyor having a removal section and being disposed about the outer periphery of said rotatable member for receiving items from said rotatable member;

guide means disposed at the removal section for guiding said items into a single file along said conveyor;

a first conveyor section comprising endless belt means for receiving the items from said removal section and accelerating the items individually, a second conveyor section having a plurality of substantially equidistantly spaced carriers disposed thereon for receiving the items from said first conveyor section and placing adjacently received items in a substantially equidistant relationship to each other, and a third conveyor section for receiving the items from the carriers and transporting them to a processing station, each carrier including a platform that rotates when adjacent the third conveyor section to effect a smooth transfer of the items from the platform to the third conveyor section.

14. A positive spacing conveyor apparatus for transporting items such as poultry carcasses comprising:

a first conveyor section for receiving and accelerating a plurality of items individually; and a second section including an item waiting station and having a plurality of substantially equidistantly spaced carriers disposed thereon for receiving the items from said first section and placing adjacently received items in a substantially equidistant spaced relationship to each other.

15. The apparatus of claim 14 wherein the item waiting station comprises a stationary support plate on which the items received from said first conveyor section rest or slide until they are received by the carriers.

16. The positive spacing conveyor apparatus of claim 14 further comprising a third conveyor section for receiving the items from the carriers and transporting them to a processing station.

17. The positive spacing conveyor apparatus of claim 14 wherein each carrier includes a platform.

18. The positive spacing conveyor apparatus of claim 17 wherein each platform rotates when adjacent the third conveying section to effect a smooth transfer of the items from the platform to the third conveyor section.

19. The positive spacing conveyor apparatus of claim 14 wherein each carrier includes an upstanding wall.

20. The positive spacing conveyor apparatus of claim 19 wherein the upstanding wall is formed by an L-shaped member.

21. A positive spacing conveyor apparatus for transporting items such as poultry carcasses comprising:

a first section for receiving and accelerating a plurality of items individually; and a second section having a plurality of substantially equidistantly spaced carriers disposed thereon for receiving the items from said first section and placing adjacently received items in a substantially equidistant spaced relationship to each other and including an exit chute for receiving the items which are improperly situated on the carriers.

22. The apparatus of claim 21 further including a return section for receiving the items from the exit chute and directing them to the rotatable member.

23. An apparatus for placing randomly received items, such as poultry carcasses, in a single file and for placing adjacent single filed items in a substantially equidistant spaced relationship comprising:

a rotatable member having an outer periphery;

a conveyor having a removal section and being disposed about the periphery of said rotatable member for receiving items from said rotatable member;

guide means disposed at the removal section for guiding said items into a single file along said conveyor;

a first conveyor section for receiving the items from said removal section and accelerating the items individually; and a second conveyor section including an item waiting station and having a plurality of substantially equidistantly spaced carriers disposed thereon for receiving the items from said first conveyor section and placing adjacently received items in a substantially equidistant spaced relationship to each other.

24. The apparatus of claim 23 wherein the rotatable member is substantially cone shaped.

25. The apparatus of claim 23 wherein the conveyor comprises an endless belt having an inner edge.

26. The apparatus of claim 25 wherein the guide means comprises a guide wall having a discharge portion disposed a predetermined distance from the inner edge of said endless belt.

27. The apparatus of claim 26 wherein the guide wall is supported by a plurality of spaced support members.

28. The apparatus of claim 23 wherein said conveyor includes a return section having means for washing said conveyor.

29. The apparatus of claim 23 further including a wiper bar disposed above the conveyor for eliminating stacking of said items.

30. The apparatus of claim 23 wherein the item waiting station comprises a stationary support plate on which the items received from said first conveyor section rest or slide until they are received by the carriers.

31. An apparatus for placing randomly received items, such as poultry carcasses, in a single file and for placing adjacent single filed items in a substantially equidistant spaced relationship comprising:

a rotatable member having an outer periphery;

a conveyor having a removal section and being disposed about the periphery of said rotatable member for receiving items from said rotatable member;

guide means disposed at the removal section for guiding said items into a single file along said conveyor;

a first conveyor section for receiving the items from said removal section and accelerating the items individually; and a second conveyor section having a plurality of substantially equidistantly spaced carriers disposed thereon for receiving the items from said first conveyor section and placing adjacently received items in a substantially equidistant spaced relationship to each other and including an exit chute for receiving the items which are improperly situated on the carriers and directing them to a return conveyor.

32. The apparatus of claim 31 further comprising a third conveyor section for receiving the items from the carriers and transporting them to a downstream processing station.

33. The apparatus of claim 31 wherein each carrier includes a platform.

34. The apparatus of claim 33 wherein each platform rotates when adjacent the third conveyor section to effect a smooth transfer of the items from the platform to the third conveyor section.

35. The apparatus of claim 31 wherein each carrier includes an upstanding wall.

36. An apparatus for placing randomly received items, such as poultry carcasses, in a single file and for placing adjacent single filed items in a substantially equidistant spaced relationship comprising:

a rotatable member having an outer periphery;

a conveyor having a removal section and being disposed about the periphery of said rotatable member for receiving items from said rotatable member;

guide means disposed at the removal section for guiding said items into a single file along said conveyor;

a first conveyor section for receiving the items from said removal section and accelerating the items individually; and a second conveyor section having a plurality of substantially equidistantly spaced carriers disposed thereon for receiving the items from said first conveyor section and placing adjacently received items in a substantially equidistant spaced relationship to each other, each carrier including an upstanding wall formed by an L-shaped member.

37. An apparatus for placing items in a single file comprising:

a rotatable member having an outer periphery;

a conveyor having a removal section and being disposed about the outer periphery of said rotatable member for receiving items from said rotatable member;

guide means disposed at the removal section for guiding said items into a single file along said conveyor;

a first conveyor section for receiving the items from said removal section and accelerating the items individually and a second conveyor section having a plurality of substantially equidistantly spaced carriers disposed thereon for receiving the items from said first conveyor section and placing adjacently received items in a substantially equidistant relationship to each other, the second conveyor section including an exit chute for receiving the items which are improperly situated on the carriers.

38. The apparatus of claim 37 further including a return conveyor for receiving the items from the exit chute and directing them to the rotatable member.

* * * * *